United States Patent [19]

DuBell

[11] 4,050,241
[45] Sept. 27, 1977

[54] STABILIZING DIMPLE FOR COMBUSTION LINER COOLING SLOT

[75] Inventor: Thomas L. DuBell, Maineville, Ohio

[73] Assignee: General Electric Company, Cincinnati, Ohio

[21] Appl. No.: 642,727

[22] Filed: Dec. 22, 1975

[51] Int. Cl.² .............................................. F02C 7/18
[52] U.S. Cl. .................................................. 60/39.66
[58] Field of Search ........................... 60/39.65, 39.66; 431/352

[56] References Cited

U.S. PATENT DOCUMENTS

| | | | |
|---|---|---|---|
| 3,064,425 | 11/1962 | Hayes | 60/39.65 |
| 3,751,910 | 8/1973 | Sweeney et al. | 60/39.65 |
| 3,826,082 | 7/1974 | Smuland et al. | 60/39.65 |

*Primary Examiner*—Martin P. Schwadron
*Assistant Examiner*—Richard Gerard
*Attorney, Agent, or Firm*—Henry J. Policinski; Derek P. Lawrence

[57] ABSTRACT

A combustion liner cooling slot is provided with a plurality of circumferentially spaced stabilizing dimples disposed in an annular lip adapted to facilitate attachment of a cooling fluid to the combustion liner in a protective film barrier. The stabilizing dimples are characterized by a depressed portion having a dimple ceiling of constant radial height and further having a decreasing circumferential width portion.

4 Claims, 6 Drawing Figures

U.S. Patent      Sept. 27, 1977      4,050,241
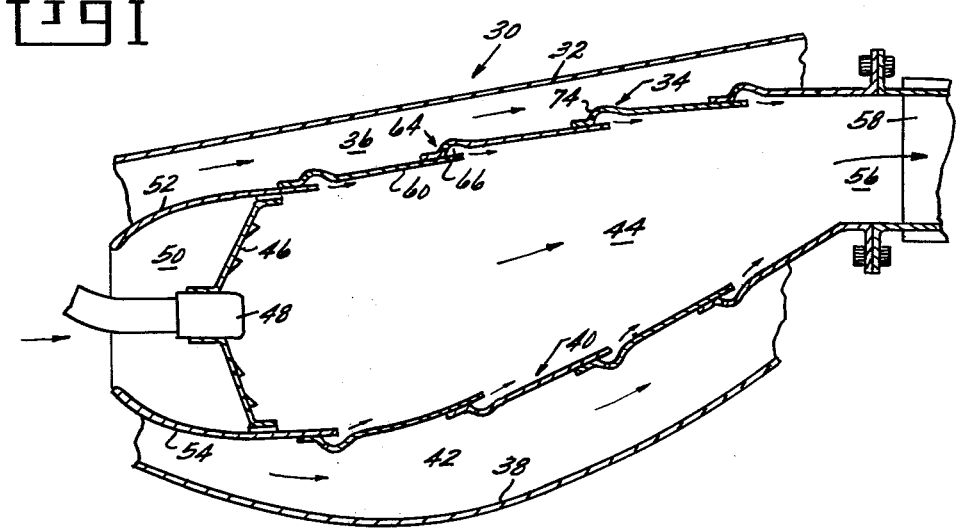
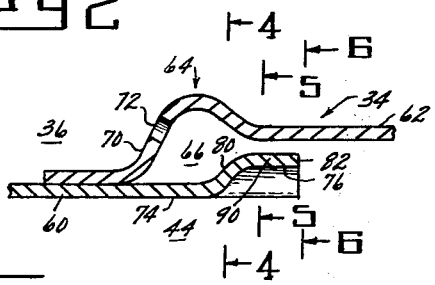 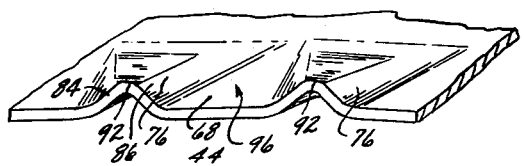
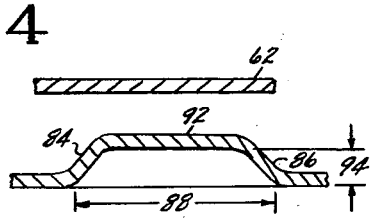 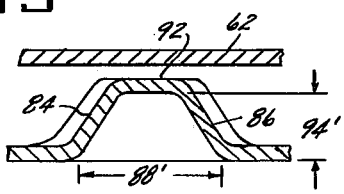
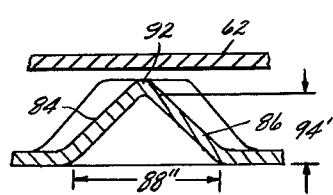

STABILIZING DIMPLE FOR COMBUSTION LINER COOLING SLOT

BACKGROUND OF THE INVENTION

This invention relates to combustion apparatus and, more specifically, to means for effectively cooling combustion chambers. For convenience of illustration and discussion, the invention will be described in connection with a jet engine of the gas turbine type. However, it will be appreciated that the structure is suitable for any high temperature application which requires effective film cooling of combustion apparatus.

Aircraft engines presently in operational use and those under development for future applications are designed to operate at extremely high temperatures. In order to prolong the life of combustors associated with such engines, new alloys have been developed which are highly compatible with the high temperature environment. However, it has also been found that by cooling the combustor under operating conditions the thermal fatigue life characteristic of the combustor are enhanced.

Generally, it is accepted practice in the art to cool combustion chambers by providing a moving film of cooling air between the inner surface of the liner and the hot gases of combustion. The film of cooling air forms a protective barrier between the liner and the hot gases and also provides for convective cooling of the liner.

Generally, in prior art devices the protective film is introduced into the combustion chamber from a plenum of cooling air surrounding the exterior of the combustor. This has been accomplished by providing for the introduction of cooling air through a series of apertures in an upstream portion of the liner into an annular lipped pocket. The streams of cooling fluid entering through the apertures are permitted to mix and coalesce within the pocket to form a uniform annular boundary layer of cooling air which is directed by the lip along the inner surface of the combustor liner.

It is well known that the lip associated with the aforementioned cooling arrangement is subject to thermal stresses which cause warpage and buckling of the lip under operating conditions. One of the approaches utilized in the past to overcome warpage and buckling of the lip has been to include in the downstream portion of the lip a series of circumferentially spaced dimples which provide localized stiffening to resist the buckling tendency induced by the thermal stresses. While the inclusion of dimples in this manner served well to overcome lip distortion, the dimples were found to create wakes in the film of cooling air discharged along the inner surface of the liner. The wakes were found to destroy the uniformity of the cooling air barrier and permit hot gas of combustion to directly contact the inner liner of the combustor thereby reducing its operating life.

Some attempts have been made to eliminate the wakes caused by dimples disposed in combustor lips. United States Patent 3,826,082 discloses an arrangement wherein the lateral walls of the dimple converge in the downstream direction. Unlike previous dimples which diverged in the downstream direction, the arrangement taught in the referenced patent sought to direct cooling air into the area immediately downstream of the dimple hence filling the area with cooling air rather than hot gases of combustion. Incorporation of dimples with converging lateral walls into combustors has proved to be at least partially successful in reducing the deleterious effects on the liner which result from dimple wakes. However, while converging lateral walls, as taught by the above-referenced patent, serve to form an exit slot characterized by increasing width in the aft direction, such walls do not insure that the cross-sectional flow area of the exit slot is also increasing. Rather, since the height of the dimples increases in the aft direction, the cross-sectional area flow area of the exit slot decreases in the same direction. Consequently, cooling air flowing through the exit slot of decreasing flow area must accelerate and converge as it flows through successive downstream cross sections of the exit slot. As the cooling air exits the slot in the aforedescribed converging manner, wakes are formed in the boundary layer of cooling film. Said another way, wakes are formed in the boundary layer of cooling film as a direct result of the flow of cooling air out of the exit slot in an accelerated convergent manner caused by the decreasing cross-sectional flow area of the exit slot. Such convergent flow will be present even though the pair of lateral walls associated with each dimple converge toward each other and form an exit slot with increasing width in the aft direction. The present invention is directed toward providing dimple construction in a lip associated with a cooling slot disposed in a combustor liner wherein each dimple is characterized by a constant height portion so as to provide, in cooperation with convergent lateral walls, an exit slot of increasing cross-sectional flow area in the aft direction. An exit slot having an increasing cross-sectional flow area will cause cooling air to exit the slot in a divergent manner so as to flow into and fill wake areas immediately aft of each dimple.

BRIEF SUMMARY OF THE INVENTION

It is therefore the primary object of the present invention to provide apparatus for cooling a liner associated with a combustor usable within a gas turbine engine.

It is another object of the present invention to provide an apparatus for cooling a combustor liner which is resistant to buckling, warpage and other distortions resulting from the operating environment of the combustor.

It is still another object of the present invention to provide an apparatus for cooling a combustor liner which directs a more uniform film of cooling air along the inner surface of the liner.

Briefly stated, the above and other related objects of the present invention, which will become apparent from the following specification and appended drawings are accomplished by the present invention which provides a combustor liner film cooling slot of the variety which includes an annular space extending circumferentially of the liner and defined between overlapping portions of telescoping liner segments. A cooling fluid plenum substantially circumscribes the liner and means are provided for transferring cooling fluid from the plenum to the space and for exhausting fluid from the space into the liner. The slot further includes an overhanging lip extending substantially axially downstream of the space for facilitating attachment of the fluid to the liner in a protective film barrier. A stabilizing dimple is disposed within the lip and includes a substantially radially depressed portion having a first radial height proximate its upstream extremity and a second radial height, greater than the first radial height, at its downstream extremity. The depressed portion further includes an intermediate segment intermediate the upstream and downstream extremities and having a radial height substantially equal to said second radial height. The dimple may be further comprised of a first circumferential width proximate its upstream extremity and a second circumferential width proximate its downstream extremity, the first width being greater than the second. The intermediate segment may be disposed immediately upstream of the downstream extremity and may cooperate therewith to form a dimple ceiling of constant radial height downstream of the first extremity.

DESCRIPTION OF THE DRAWINGS

While the specification concludes with a series of claims which particularly point out and distinctly claim the subject matter comprising the present invention, a clear understanding of the invention will be readily obtained from the following detailed description, which is given in connection with the accompanying drawings, in which:

FIG. 1 is a simplified cross-sectional view of a combustion chamber of a gas turbine engine employing cooling slots;

FIG. 2 depicts a cross-sectional side view of the cooling slot in accordance with the present invention;

FIG. 3 shows a perspective view of the dimpled lip shown in FIG. 2;

FIG. 4 is a cross-sectional end view of the cooling slot shown in FIG. 2 taken along the line 4—4;

FIG. 5 is a cross-sectional end view of the cooling slot shown in FIG. 2 taken along the line 5—5; and FIG. 6 is a cross-sectional end view of the cooling slot shown in FIG. 2 taken along the line 6—6.

DESCRIPTION OF THE PREFERRED EMBODIMENT

Referring to FIG. 1, a combustion chamber designated generally at 30, is depicted illustrating the relationship of the present invention to substantially typical combustion chambers of the gas turbine variety. An outer liner 32 combines with axially segmented liner 34 to define an outer plenum 36. An inner liner 38 combines with an inner portion of the segmented combustion liner 40 for the purpose of defining a radially inner cooling fluid plenum 42. The combustion zone itself is designated 44 and is defined by liners 34 and 40 as well as by an upstream dome 46 which cooperates with a fuel nozzle 48 through which fuel for combustion is sprayed into the combustion zone 44. An air/fuel inlet 50 is defined between axial extensions 52 and 54 of liners 34 and 40, respectively.

In general operation, a flow of atmospheric air is pressurized by means of a compressor (not shown) disposed upstream of the combustion zone 44 with the compressor discharge directed partially into plena 52 and 54 as well as into the fuel/air inlet 50. A quantity of fuel is mixed with the portion of air entering fuel/air inlet 50 and is ignited within combustion zone 44. The rapid expansion of burning gases and the configuration of liners 34 and 40 results in the gases being forced from combustion zone 44 through an outlet 56 and into engagement with a turbine 58. Rotary portions of the turbine are driven by this exiting fluid and a portion of the energy thereof serves to drive the upstream compressor through an interconnecting shaft. The remaining energy of the gas stream provides energy for driving thrust toward the left in FIG. 1.

The cooling of liners 34 and 40 is the subject of the present invention, and will be described with respect to the remaining figures. FIG. 2 illustrates a cross-sectional view of the present invention. FIG. 3 is a perspective view of this same slot as viewed in the upstream direction. Referring back to FIG. 1, liner 34 may be seen to be divided into a number of axially adjacent segments. A typical segment 60 is seen to be in telescopic cooperation with a typical segment 62 downstream thereof by means of a junction designated generally at 64. At this junction is disposed a cooling slot configuration which comprises a cooling film promoter for passing cooling fluid from plenum 36 in a protective film barrier upon the inner surface of liner 34. Liner segments 60 and 62 cooperate to form a circumferentially extending annular space 66. The space 66 includes a substantially closed upstream end 70 and a downstream-facing open end or exit 68. Thus the space is substantially isolated from the combustion zone 44 except for communication through exit 68. A plurality of circumferentially spaced apertures 72 are disposed in the upstream end 70 so as to provide communication of cooling air from plenum 36 to space 66. Hence, a flow path for cooling air is provided whereby cooling air in plenum 36 flows into space 66 and thence out of exit 68 along the inner surface of liner 34.

In order to ensure that cooling air will exit from exit 68 in a uniform thin film flowing along the inner surface of the liner, it has been common practice to provide an axially and circumferentially extending lip at the downstream end of upstream liner segment 60. The lip serves as the radially inner boundary of space 66 and usually is of sufficient length to permit the individual streams of cooling air entering space 66 through apertures 72 to mix and substantially coalesce in space 66 before exiting into the combustion zone 44. However, it has been found that the axially extending lip was susceptible to buckling, warping and other distortions due to exposure to the high temperature associated with the hot gases of combustion. As a solution to the aforementioned distortion, prior art attempts have included the application of a plurality of circumferentially spaced dimples disposed in the lips for the objective of imparting stiffness thereto. The solution, however, introduced wakes in the film of cooling air as it exited into the combustion zone. As a result, cooling air exiting into the combustion zone was not uniform in film thickness.

The present invention which overcomes the adverse effects associated with prior art stabilizing dimples will now be described. As viewed in FIG. 2, the cooling slot comprising the present invention includes an axially and circumferentially extending, overhanging lip 74 disposed at the downstream end of upstream liner segment 60. In order to stiffen overhanging lip 72 a plurality of circumferentially spaced stabilizing dimples 76 are disposed within the lip 74. Stabilizing dimples 76 are each formed as depressions in the lip material itself, with the substantially radially depressed portion 78 extending in the direction from the lip surface toward the associated downstream liner segment 62.

The substantially radially depressed portion 78 includes an upstream extremity 80, a downstream edge 82 and an intermediate segment 90 disposed therebetween. Dimple 74 can be characterized as a converging dimple for reasons now to be set forth.

Reference to FIGS. 4, 5 and 6 which depict successively downstream cross-sectional end views of the dimple 74 will be of assistance in understanding the lateral convergence of dimple 74. FIG. 4 depicts a cross-sectional view at the upstream extremity 80 of depressed portion 78. A pair of lateral axis extending dimple walls 84 and 86 form the lateral extremities of the dimple. Lateral wall 84 is spaced from lateral wall 86 by dimple width 88 at the upstream extremity 80 of depressed portion 78. FIG. 5 depicts a cross-sectional view of intermediate segment 90 of depressed portion 78. Lateral wall 84 is spaced from lateral wall 86 by dimple width 88' at the intermediate segment 90 of depressed portion 78. FIG. 6 depicts a cross-sectional view of downstream edge 82 of depressed portion 78. Lateral wall 84 is spaced from wall 86 by dimple width 88" at downstream edge 82. Dimple width 88" is less than dimple width 88' which is less than dimple width 88 such that lateral walls 84 and 86 converge toward each other as the depressed portion 78 of dimple 76 is axially traversed from its upstream extremity 80 to its downstream edge 82.

Dimple 76 is also characterized by a constant height portion downstream of its upstream extremity 80. More specifically, as viewed in FIG. 4, lateral walls 84 and 86 extend radially outwardly from lip 74 and terminate in dimple ceiling 92 of depressed portion 78. Dimple ceiling 92 is displaced from lip 74 by ceiling height 94 at the upstream extremity 80. As viewed in FIG. 5, at intermediate segment 90 dimple ceiling 92 is displaced from lip 76 by ceiling height 94' which is greater than the ceiling height 94 of the dimple at upstream extremity 80. Said another way, the height of the dimple is increasing as the dimple is axially traversed from its upstream extremity 80 to its intermediate segment 90. However, as best viewed in FIGS. 5 and 6, the dimple ceiling 92 is of the same height at its intermediate segment 90 as it is at its downstream edge 82. That is, at downstream edge 82, dimple ceiling 92 is displaced from lip 74 by the same height 94' as it is at the intermediate segment 90. Hence, the dimple 76 is of constant height downstream of upstream extremity 80.

It is apparent from the preceding description that the stabilizing dimple comprising the present invention includes a pair of lateral walls which converge toward each other and further includes a constant height portion. When dimples characterized in this manner are disposed in the flow path of cooling air flowing along lip 74, a flow channel 96 is defined between adjacent dimples which has consecutive downstream cross-sectional areas which increase in the downstream or aft direction. Cooling air flowing from space 66 into combustion zone 44 must flow between the dimples 76. Since consecutive cross-sectional flow areas between the dimples increase in magnitude in the aft direction, cooling air diverges as it flows in the downstream direction. Diverging cooling air emerging into combustion zone 44, diffuses into and fills the wake areas downstream of each dimple 76. Hence a uniform boundary layer of cooling film will be emerged into the combustion zone 44 along the inner surface of liner 34. Prior art devices, such as that shown in the aforementioned United States letters patent, utilized stabilizing dimples having a pair of converging lateral walls. However, since these prior art dimples were further characterized by an increasing height portion, they fail to provide an exit flow channel which increases in cross-sectional area in the downstream or aft direction to cause divergent flow of cooling air as it emerges into the combustion zone.

While a preferred embodiment of the present invention has been described for purposes of illustration, it should be understood that modifications or variations will occur to those skilled in the art which do not depart from the scope of the invention as set forth in the appended claims.

I claim:

1. In a combustor liner film cooling slot of the variety including an annular space extending circumferentially of the liner and defined between overlapping portions of telescoping liner segments, a cooling fluid plenum substantially circumscribing the liner, means for transferring cooling fluid from the plenum to the space, means for exhausting fluid from the space onto the liner, and an overhanging lip extending substantially axially downstream of the space for facilitating attachment of the fluid to the liner in a protective film barrier, the improvement comprising:

a stabilizing dimple disposed within said lip, the dimple including a substantially radially depressed portion, the depressed portion having a first radial height proximate its upstream extremity, a second radial height at its downstream extremity, said second radial height being greater than said first radial height, said depressed portion further including an intermediate segment intermediate said upstream and downstream extremities and having a radial height substantially equal to said second radial height.

2. The invention in claim 1 wherein said depressed portion is further comprised of a first circumferential width proximate its upstream extremity and a second circumferential width proximate its downstream extremity, the first width being greater than the second.

3. The invention as set forth in claim 2 wherein said intermediate segment is disposed immediately upstream and adjacent to said downstream extremity, said intermediate segment and said downstream extremity cooperating to form a dimple ceiling of constant radial height downstream of said upstream extremity.

4. The invention as set forth in claim 3 further including a plurality of said stabilizing dimples so characterized, said dimples spaced circumferentially about said lip, each of said dimples cooperating with adjacent dimples to define a flow channel for the passage of cooling air from said space to said liner, said flow channel having consecutive downstream cross-sectional areas of increasing magnitude in the downstream direction.

* * * * *